United States Patent [19]
Ehret et al.

[11] Patent Number: 5,402,342
[45] Date of Patent: Mar. 28, 1995

[54] METHOD FOR CONTROLLING MOTOR VEHICLE STABILITY

[75] Inventors: Thomas Ehret, Seelbach; Uwe Hartmann, Stuttgart, both of Germany

[73] Assignee: Robert Bosch GmbH, Stuttgart, Germany

[21] Appl. No.: 90,837

[22] Filed: Jul. 12, 1993

[30] Foreign Application Priority Data

Sep. 4, 1992 [DE] Germany .................. 42 29 504.1

[51] Int. Cl.$^6$ .................................................. B60T 8/58
[52] U.S. Cl. .................. 364/424.05; 364/426.02; 364/426.03; 180/197
[58] Field of Search .................. 364/424.05, 426.02, 364/426.03; 180/197; 303/100, 106

[56] References Cited

U.S. PATENT DOCUMENTS

| | | | |
|---|---|---|---|
| 5,051,908 | 9/1991 | Shiraishi | 364/426.03 |
| 5,172,318 | 12/1992 | Meissner et al. | 364/426.03 |
| 5,238,081 | 8/1993 | Maeda et al. | 364/426.03 |
| 5,332,300 | 7/1994 | Hartmann et al. | 364/426.02 |
| 5,341,297 | 8/1994 | Zomotor et al. | 364/426.03 |

*Primary Examiner*—Gary Chin
*Attorney, Agent, or Firm*—Kenyon & Kenyon

[57] ABSTRACT

A method for controlling vehicle stability comprises the steps of determining the rate of yaw and comparing it to a setpoint rate of yaw. The deviation is used to adjust a counter rate of yaw by means of a controller when the rate of yaw is too large. An optimal profile for a setpoint rate of yaw is determined, even when parameters such as the coefficient of friction of the road surface and the vehicle speed vary.

4 Claims, 3 Drawing Sheets

METHOD FOR CONTROLLING MOTOR VEHICLE STABILITY

FIELD OF THE INVENTION

The present invention relates to a method for controlling vehicle stability and in particular to a method for controlling vehicle stability during curve travel of the vehicle.

BACKGROUND INFORMATION

German Provisional Patent No. 37 31 756 describes a method for determining a longitudinal acceleration as an acceleration value which corresponds to a coefficient of friction.

SUMMARY OF THE INVENTION

The present invention provides a method for controlling vehicle stability during curve travel that takes advantage of the realization that in automatic systems for controlling dynamic driving performance, the rate of yaw has proven to be a controlled variable that is particularly suited for improving vehicle controllability and stability. This is because not only can the rate of yaw be measured directly with sensors, but it also can be estimated. In addition, the rate of yaw can be controlled very well by changing the wheel slip values or the tire slip angle and, consequently, through the application of yawing momenta.

Methods have already been described for stipulating a setpoint value for the rate of yaw. What is new about the method according to the present invention is that not only does the vehicle react to steering-angle setpoint selections, as desired by the driver, but it also maintains a stable state, which is dependent upon the coefficient of friction (also referred to as "adhesion coefficient" or "static friction coefficient") of the street and in which the float angle does not increase further.

As mentioned, the measuring signals required for this are the steering angle $\delta$, the transversal acceleration $a_q$, the vehicle longitudinal speed $v_F$, and the rate of yaw $\omega$ as a controlled variable.

In the case of the measured transversal acceleration, measuring errors caused by the rolling motion of the vehicle and gravitational components are to be expected. The method according to the present invention makes allowances for these errors.

The longitudinal speed of the vehicle can be made available accurately enough using known antilock or acceleration-skid control systems.

DETAILED DESCRIPTION

Figure 1:
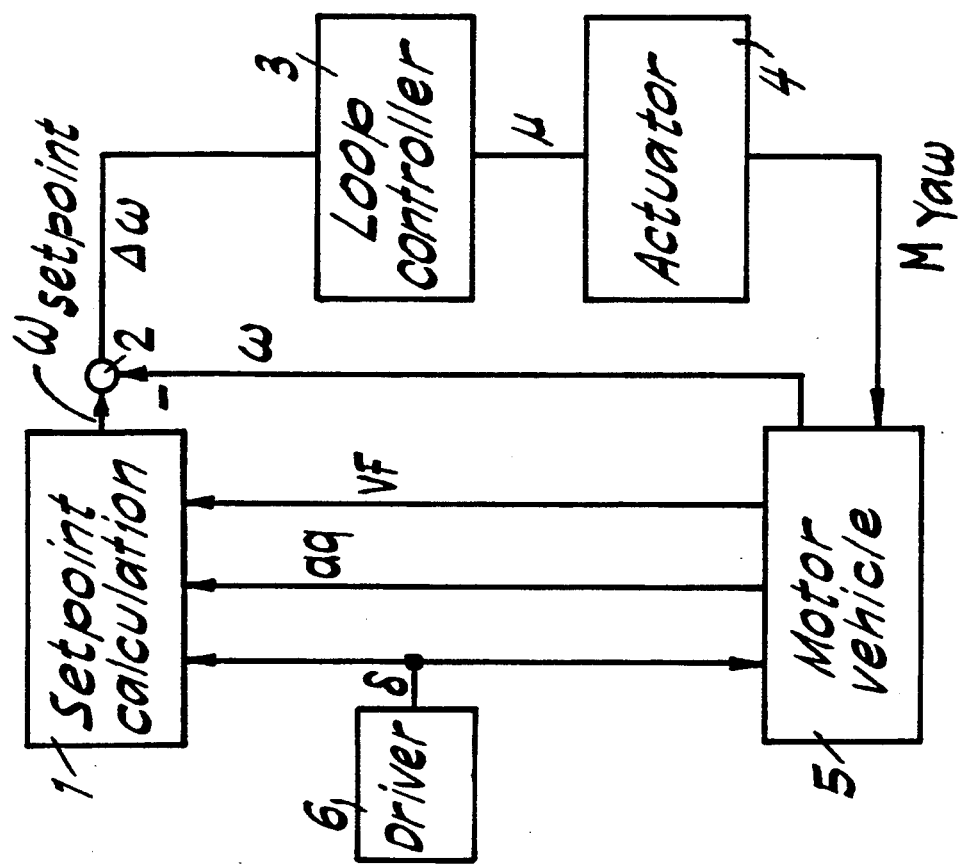
FIG. 1 shows a block diagram of an automatic control of dynamic driving performance, in which the setpoint rate of yaw can be applied in accordance with the present invention.

FIG. 1 illustrates how the setpoint calculation described here can be applied to a concept for controlling dynamic driving performance. A setpoint calculation (block 1) processes the following input variables: steering angle $\delta$ (specified by the driver in block 6), transversal acceleration $a_q$, and vehicle speed $v_F$. The setpoint value $\omega_{setpoint}$ is compared to the measured rate of yaw $\omega$ (in the comparator 2), and the differential is fed to a controller 3, which outputs suitable actuating signals u. An actuator 4, which can be, for example, a wheel-slip control circuit having braking-pressure modulation (c.f. German No. DE 40 30 724), utilizes wheel-slip changes to influence the yawing moment $M_{yaw}$ acting on the vehicle, through which means the measured rate of yaw $\omega$ changes in the desired manner. The controller 3 can be designed, for example, in accordance with the model-supported controlling means described in German No. DE 40 30 704.

The following arithmetic operations for acquiring the setpoint rate of yaw are performed in accordance with the present invention:

First a steady-state setpoint rate of yaw, which is dependent upon the steering angle $\delta$ and upon the longitudinal speed $v_F$ of the vehicle, is calculated as follows:

$$\omega_{setpoint}^0 = \frac{v_F}{L(1 + V_F^2/VCH^2)}$$

L represents the wheelbase. VCH represents the characteristic speed of the vehicle, with which the measure of the tendency to understeer can be determined, in some instances also dependent upon the driving state (e.g., driven, rolling freely, or braked). The speed can amount to, for example, 25 m/s. This occurs in block 20 of FIG. 2.

As an additional non-linearized value for the setpoint rate of yaw, the variable $\omega_{setpoint}^1$ is calculated as follows:

$$\omega_{setpoint}^1 = a_q/v_F$$

with the transversal acceleration $a_q$.

In terms of absolute value, $\omega_{setpoint}^1$ is restricted to a lower value, which corresponds to the lowest possible value of transversal acceleration that occurs on public streets in the case of corner travel in the extreme range (i.e., in the area of tolerance limit), e.g. 0.7 m/s².

$$\omega_{setpoint}^1 \geq 0.7/v_F \text{ for } \omega_{setpoint}^0 > 0$$

$$\omega_{setpoint}^1 \leq -0.7/v_F \text{ for } \omega_{setpoint}^0 < 0$$

Figure 2:
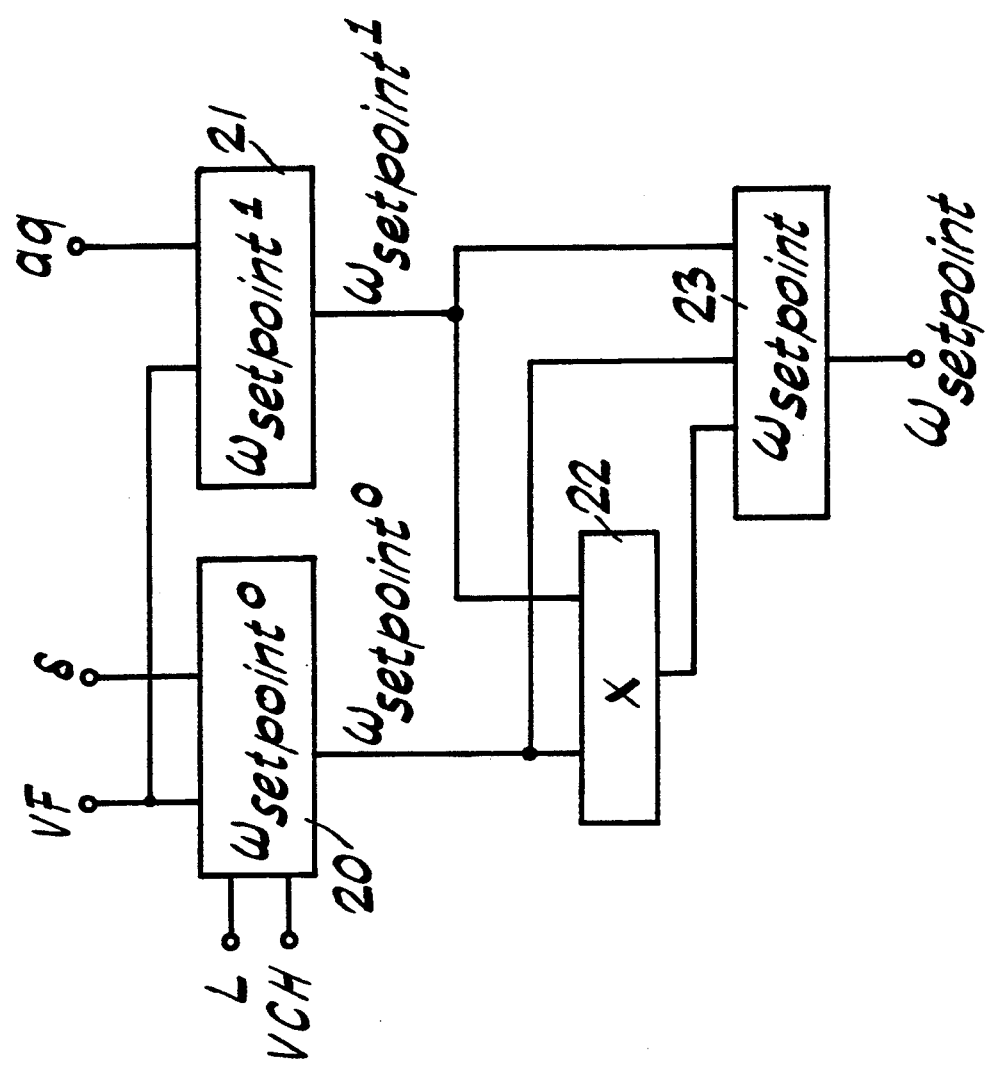
FIG. 2 shows a possible design for calculating the setpoint value in block 1 of FIG. 1.

This calculation of $\omega_{setpoint}^1$ is carried out in block 21 of FIG. 2. What is fundamental to the present invention is the way in which these two values, $\omega_{setpoint}^0$ and $\omega_{setpoint}^1$, are used to determine the actual setpoint rate of yaw $\omega_{setpoint}$.

The following equations are used to calculate $\omega_{setpoint}$. First, an intermediate variable x is determined in block 22:

$$x = (\omega_{setpoint}^1/\omega_{setpoint}^0 - k)^n/(1-k)^n$$

where k=constant and 0<k<1
where n=constant and 0<n

The parameter k is specified dependent upon the particular motor vehicle and is, for example, 0.5. Similarly, the exponent n is specified dependent upon the particular motor vehicle and is, for example, 0.5 or 1.

The intermediate variable x is still limited between zero and one, i.e. $0 \leq x \leq 1$.

Another block 23 then formulates the setpoint rate of yaw $\omega_{setpoint}$ in accordance with the following equation:

$$\omega_{setpoint} = x\, \omega_{setpoint}{}^0 + (1-x)\, \omega_{setpoint}{}^1$$

Figure 3:
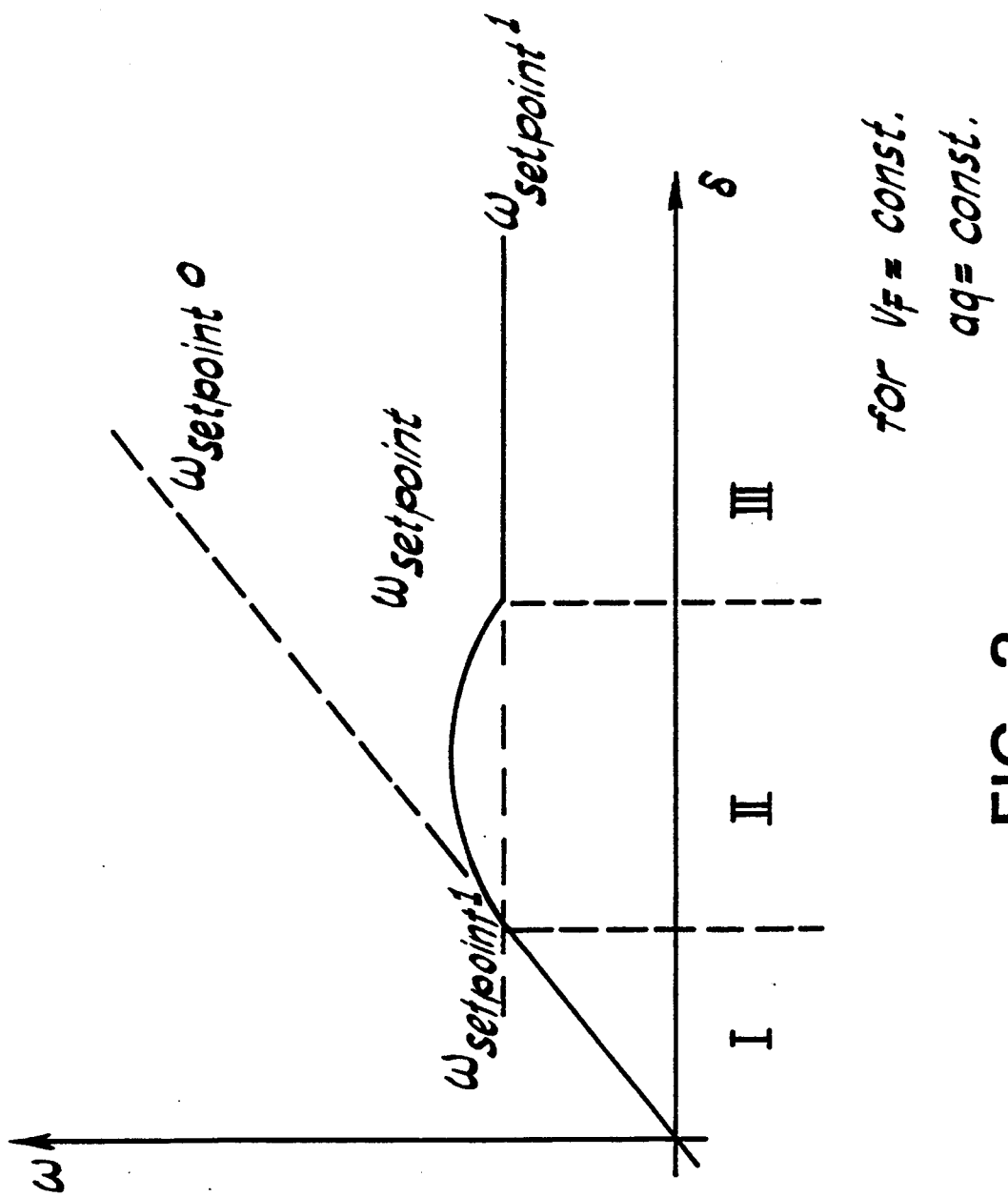
FIG. 3 shows the characteristic curve of the setpoint rate of yaw in accordance with the present invention.

This means that when $\omega_{setpoint}{}^0$ is smaller than $\omega_{setpoint}{}^1$ (all values being positive, the equivalent applies to negative values), then $\omega_{setpoint}$ equals $\omega_{setpoint}{}^0$. Thus, the setpoint value for the rate of yaw corresponds to the driver setpoint selection when the vehicle is not driven in the extreme range. This is illustrated by the diagram of FIG. 3 in region I. $\omega_{setpoint}$ is plotted in FIG. 3 in accordance with the above equations, where a constant vehicle speed $v_F$ and a constant transversal acceleration aq are assumed in this case.

If $\omega_{setpoint}{}^0$ is greater than $\omega_{setpoint}{}^1/k$ (k being equal to 0.5, i.e., at least twice as large), then, as a result of $\omega_{setpoint}{}^0$ (which corresponds to the wish of the driver), the rate of yaw $\omega_{setpoint}{}^1$ permitted for a stable driving performance is exceeded by far, and $\omega_{setpoint}{}^1$ is used as a setpoint value $\omega_{setpoint}$ (region III of FIG. 3).

Between these two regions (i.e., in region II), $\omega_{setpoint}$ initially follows the value $\omega_{setpoint}{}^0$ and is then lowered to $\omega_{setpoint}{}^1$.

The following is achieved through this procedure:

For travel below the extreme range (i.e., $\omega_{setpoint}{}^0$ and $\omega_{setpoint}{}^1$ are similar in magnitude, or $\omega_{setpoint}{}^0$ is smaller), errors in the measured transversal acceleration do not have an effect, since $\omega_{setpoint}{}^0$ is predominantly used as a setpoint value for yaw. It is not possible for $\omega_{setpoint}$ to be limited to a value $\omega_{setpoint}{}^1$, which is too small, for instance. The wish of the driver is taken fully into consideration.

If $\omega_{setpoint}{}^0$ is clearly larger than $\omega_{setpoint}{}^1$ (i.e, for travel in the extreme range, in which the curve radius desired by the driver is narrower than is physically possible), then the setpoint rate of yaw is limited to the value $\omega_{setpoint}{}^1$. In this manner, vehicle stability is ensured.

What is claimed is:

1. A method for controlling vehicle stability during curve travel, comprising the steps of:
   determining a steering angle $\delta$, a rate of yaw $\omega$, a vehicle speed $v_F$, and a vehicle acceleration a;
   determining a setpoint rate of yaw $\omega_{setpoint}$ as a function of the steering angle $\delta$ and the vehicle speed $v_F$, such that if the steering angle $\delta$ falls within a lower range, the setpoint rate of yaw $\omega_{setpoint}$ rises linearly with the steering angle $\delta$, and if the steering angle $\delta$ falls within an upper range, the setpoint rate of yaw $\omega_{setpoint}$ is constant, the lower and upper ranges being separated by a transition region;
   comparing the determined rate of yaw $\omega$ to a profile of the setpoint rate of yaw $\omega_{setpoint}$ to determine a deviation $\Delta\omega$;
   wherein the setpoint rate of yaw $\omega_{setpoint}$ is determined in accordance with the relation $$\omega_{setpoint} = x\, \omega_{setpoint}{}^0 + (1-x)\, \omega_{setpoint}{}^1$$

wherein $\omega_{setpoint}{}^0$ is determined by the relation $$\omega_{setpoint}^0 = \frac{v_F}{L\,(1 + v_F{}^2/VCH^2)}$$

wherein L represents a vehicle wheelbase and VCH represents a characteristic speed of the vehicle, wherein $\omega_{setpoint}{}^1$ is determined by the relation $$\omega_{setpoint}{}^1 = aq'/v_F$$

wherein a second transversal acceleration aq' of the vehicle is as follows:

$$aq' = aq_{min} \text{ for } aq>0 \text{ and } aq<aq_{min}$$

$$aq' = aq_{min} \text{ for } aq<0 \text{ and } aq>-aq_{min}$$

$$aq' = aq \text{ otherwise}$$

wherein aq represents a first transversal acceleration of the vehicle and $aq_{min}$ represents a lowest value for aq on public streets during cornering travel of the vehicle in an extreme vehicle operating range, wherein x is determined by the relation $$x = (\omega_{setpoint}{}^1/\omega_{setpoint}{}^0 - k)^n/(1-k)^n$$

wherein k is a first constant between 0 and 1, n is a second constant greater than 0, and x is limited to values between and including 0 and 1; and controlling the stability of a vehicle during said curve travel based upon the determined deviation $\Delta\omega$.

2. The method according to claim 1, wherein the first constant k is dependent upon the type of vehicle.

3. The method according to claim 1, wherein the second constant n is dependent upon the type of vehicle.

4. The method according to claim 1, wherein the first constant k is equal to 0.5.

* * * * *